Oct. 4, 1960 M. L. HEILIG 2,955,156
STEREOSCOPIC-TELEVISION APPARATUS FOR INDIVIDUAL USE
Filed May 24, 1957 3 Sheets-Sheet 1

INVENTOR
Morton L. Heilig
BY
his ATTORNEYS

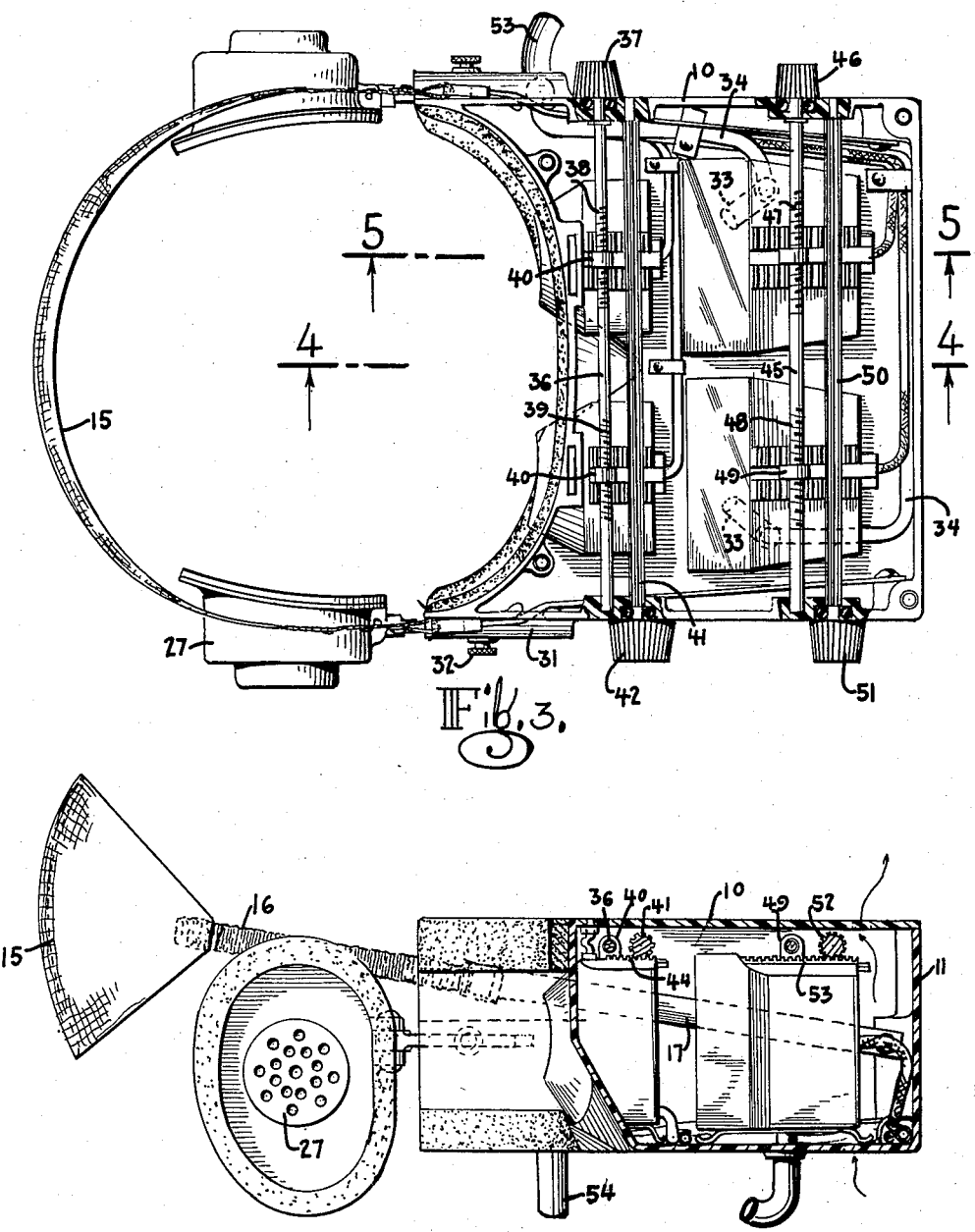

Oct. 4, 1960           M. L. HEILIG           2,955,156
STEREOSCOPIC-TELEVISION APPARATUS FOR INDIVIDUAL USE
Filed May 24, 1957           3 Sheets-Sheet 3
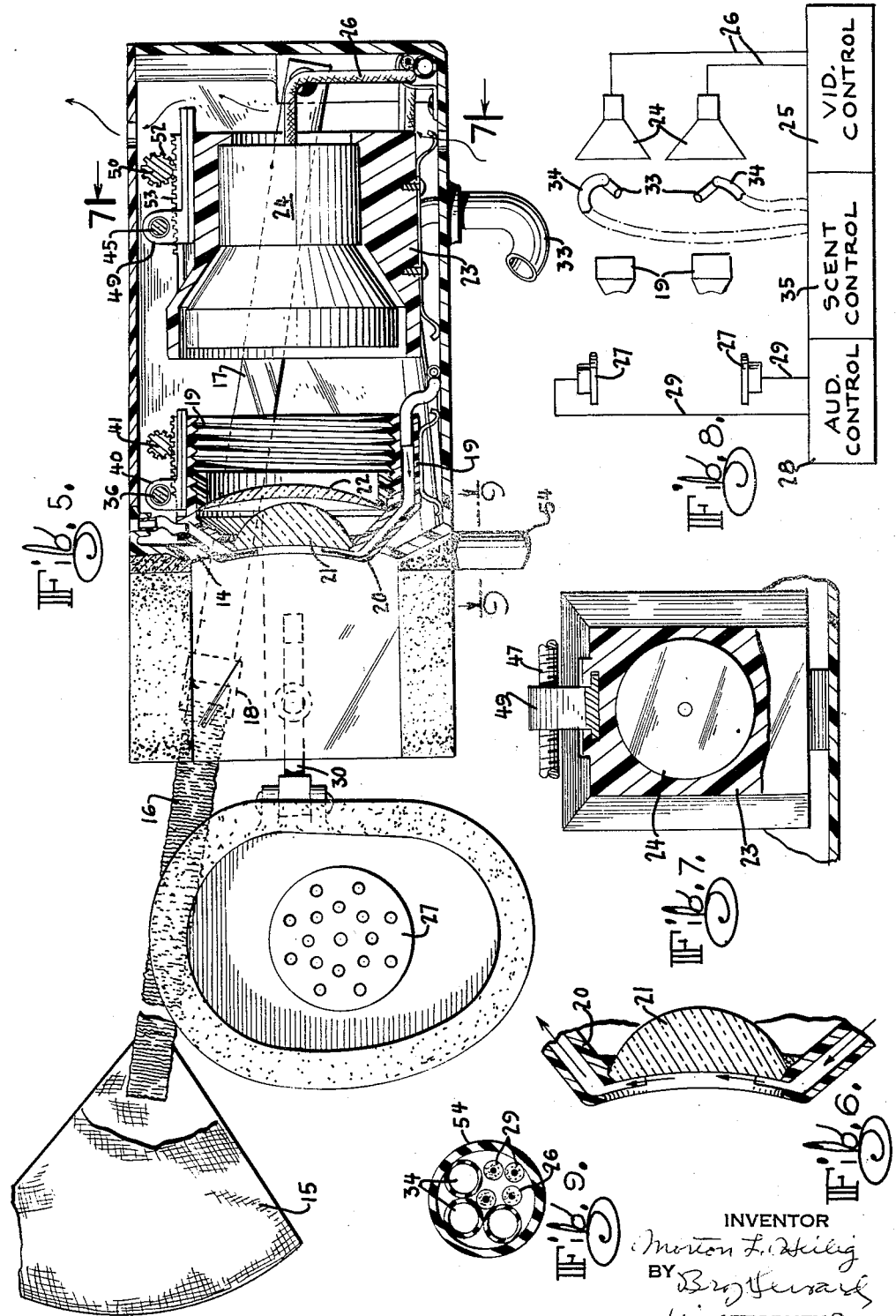
INVENTOR
Morton L. Heilig
BY
his ATTORNEYS

United States Patent Office 2,955,156
Patented Oct. 4, 1960

2,955,156

STEREOSCOPIC-TELEVISION APPARATUS FOR INDIVIDUAL USE

Morton L. Heilig, New York, N.Y.
(128 W. Walnut St., Long Beach, N.Y.)

Filed May 24, 1957, Ser. No. 661,325

2 Claims. (Cl. 178—6.5)

My invention is directed to improvements in stereoscopic-television apparatus for individual use.

My invention generally speaking comprises the following elements: a hollow casing, a pair of optical units, a pair of television tube units, a pair of ear phones and a pair of air discharge nozzles, all coacting to cause the user to comfortably see the images, hear the sound effects and to be sensitive to the air discharge of said nozzles.

One object of my invention is to provide easily adjustable and comfortable means for causing the apparatus containing the optical units, to be held in proper position on the head of the user so that the apparatus does not sag, and so that its weight is evenly distributed over the bone structure of the front and back of the head, without the necessity of holding the apparatus up by hand.

Another object is to provide means whereby the optical and television tube units may be individually adjusted to bring said units into their proper positions with respect to the eyes of the user and with respect to each other.

Another object is to provide ear phones which are so designed that the outer ear is completely free and untouched, thus allowing the ear phones to operate fully as sound focusing organs.

Another object is to provide means for independently adjusting the pair of ear phones to bring them into proper position with respect to the ears of the user.

Another object is to provide means for conveying to the head of the spectator, air currents of varying velocities, temperatures and odors.

Another object is to provide the optical units with a special lens arrangement which will bend the peripheral rays coming from the television tube so that they enter the eyes of the user from the sides thereof, creating the sensation of peripheral vision filling an arc of more than 140° horizontally and vertically.

A practical embodiment of my invention is represented in the accompanying drawings in which:

Fig. 3 represents on an enlarged scale a top plan view of the apparatus with the top of the hollow casing removed.

Fig. 4 represents a longitudinal section taken in the plane of the line 4, 4 of Fig. 3 looking in the direction of the arrows.

Fig. 5 represents on an enlarged scale a longitudinal section taken in the plane of the line 5, 5 of Fig. 3 looking in the direction of the arrows.

Fig. 6 represents a detail section on an enlarged scale through one of the lenses of an optical unit.

Fig. 7 represents a cross-section in the plane of the line 7, 7 of Fig. 5 looking in the direction of the arrows.

Fig. 8 represents in diagram the controls for the ear phones, the air discharge nozzles and the television tubes, and Fig. 9 represents on an enlarged scale a cross-section taken in the plane of line 9, 9 of Fig. 5 looking in the direction of the arrows.

Figure 1:
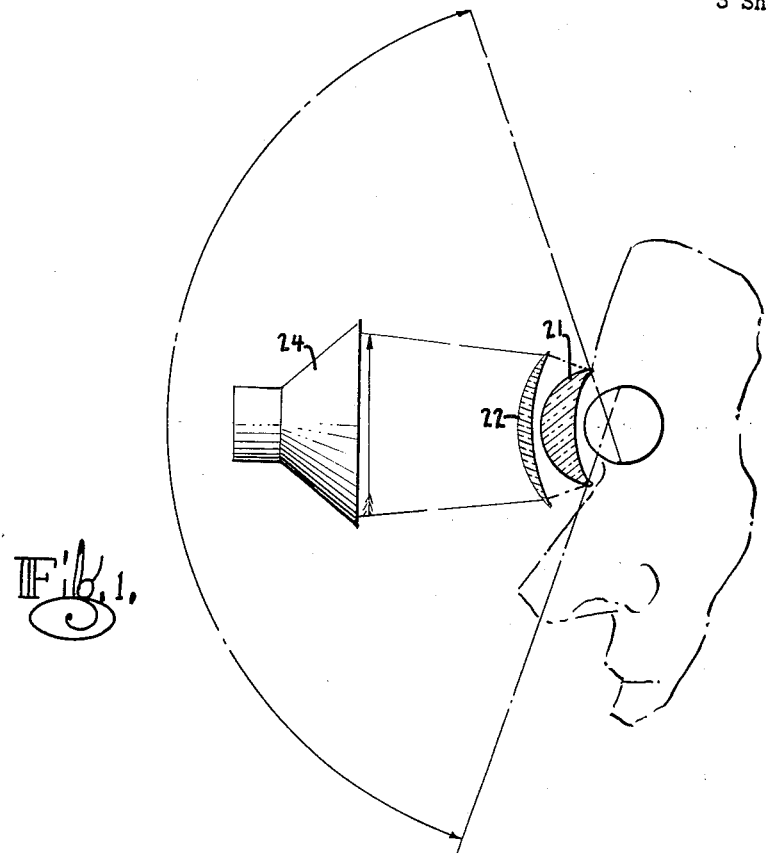
Fig. 1 represents a diagrammatic view showing the relative positions of the optical units, the television tubes and the eyes of the user.

The hollow casing 10 of the stereoscopic-television apparatus is shown as having its front end 11 closed and its rear end 12 recessed at 13 to leave room for the nose of the user and also is shaped to conform to the face of the user around the eye sockets.

This rear end 12 of the casing 10 also has a pair of spaced eye openings 14 therethrough.

The adjustable means for properly holding the casing 10 in its proper position on the head of the user, comprises the following elements: A wide band 15, preferably of cloth material, is shaped to fit the back of the head of the user, which band is shown as having two elastic side straps 16 leading forwardly to the casing 10. Two more preferably rigid side straps 17 lead rearwardly from the front end of the casing 10 into position to be adjustably fastened by suitable devices as buckles 18 to the first named side straps 16.

Each of the pair of optical units is adjustably mounted within the casing 10 and it is shown as comprising a suitable tubular housing 19 having an open outer end and a tapered rear end 20. Inner and outer coacting peripheral vision lenses 21 and 22 are located within the housing 19 opposite one of the eye openings 14 through the inner end 12 of the casing 10.

Figure 2:
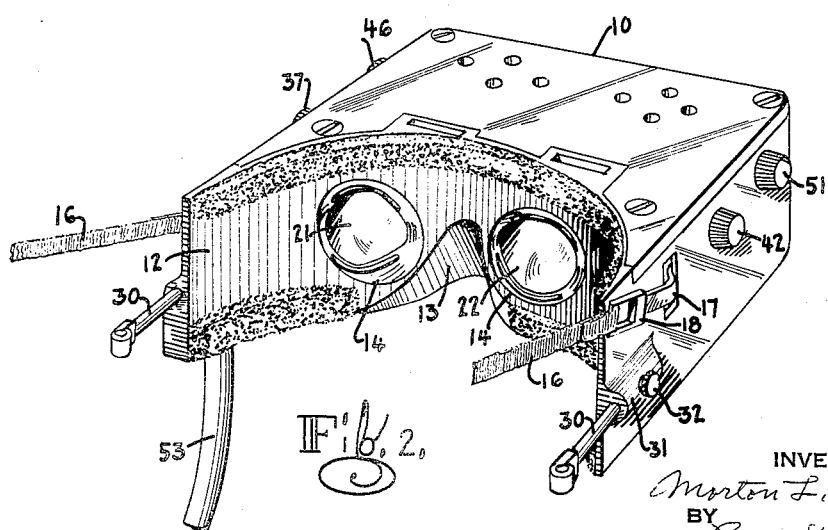
Fig. 2 represents a detailed perspective view of the apparatus with the ear phones omitted.

As seen in Figures 1 and 5 of the drawings, the peripheral rim of each lens 21 and 22 is turned toward the user or wearer of the device. Moreover, as better seen in Figure 2, each of the lenses has a portion thereof which extends toward the other lens so that the lens substantially fits the eye socket of a wearer.

Each of the pair of television tube units is adjustably mounted within the casing 10 and it is shown as comprising a tubular housing 23 containing a television tube 24, preferably a colored tube, opposite its optical unit. This tube 24 is connected through a suitable control 25 by suitable wiring 26.

Each one of the pair of sound receiving elements as ear phones 27 is connected through a suitable control 28 to a suitable source of sound by wiring 29. Each of these ear phones is adjustably supported by the casing 10, in this instance by a rod 30 hinged to the ear phones 27, for lateral adjustment, which rod is slidable in a socket 31 which carries a set screw 32 for holding the rod in proper position to bring its ear phone 27 to a point adjacent to the user's ear.

Each one of a pair of air discharge nozzles 33 is connected by a tube 34 leading to a suitable air supply source through a control 35 which source may be perfumed air.

The separate devices which I have shown for adjusting each of the optical units laterally and longitudinally comprise the following elements: For the lateral adjustment of the optical unit, a cross rod 36 provided with a handle 37 is rotatably mounted in the sides of the casing 10 for turning the rod in either direction. This rod has right and left-hand threaded portions 38, 39 connected with a stud 40 on the optical unit.

For the longitudinal adjustment of the optical units a cross rod 41 provided with a suitable handle 42 is rotatably mounted in the sides of the casing 10 and it is provided with a gear and rack connection 43, 44 with each of the optical units.

The separate devices which I have shown for adjusting each of the television units laterally and longitudinally, comprise the following elements: For the lateral adjustment of each of the television tubes a cross rod 45 is provided with a handle 46 rotatably mounted in the sides of the casing 10, which rod is provided with right and left-hand threaded portions 47, 48 engaging a stud 49 at the television tube unit.

For the longitudinal adjustment of these television tubes units a cross rod 50 provided with a handle 51 is rotatably mounted in the sides of the casing 10 and it is provided with a gear and rack connection 52, 53 with each television tube unit.

A single cable 54 may be provided for housing the wires 26, the sound wires 29, and the air tubes 34.

It will be observed that by placing one small television tube and peripheral vision lens system before each eye of the user, one ear phone by each ear, and one air duct before each nostril, the spectator is given a complete sensation of reality, i.e., moving three dimensional images, which may be in color, with 100% peripheral vision, binaural sound, scents and air breezes.

By the independent feeding of right and left eyes with images taken by separate film or TV cameras equipped with wide angle lenses, a truly three dimensional peripheral image is created.

By providing independent ear phones, which are fed separately from sounds recorded by independent microphone systems, excellent stereophonic or binaural sound is given.

By providing separate air nozzles, supplied at various temperatures and velocities, the spectator may be given many different sensations, as varying breezes of air of different temperatures which may be scented or not.

By providing the hooded rear end of the casing snugly fitting around the eye sockets, any external light is prevented from entering the visual optical system from the sides of the casing.

It will be understood that various changes may be resorted to in the form, construction and arrangement of the several elements of my apparatus, without departing from the spirit and scope of this invention and hence it is not intended to be limited to the particular embodiments shown and described herein.

What I claim is:

1. A stereoscopic television apparatus for individual use comprising an enclosed, hollow casing, one portion of said casing being concave to fit about the face of a wearer, said one portion having two eye openings, means to mount said casing on the head of a wearer with said eye openings in position to be looked through by the wearer, two television units mounted within said casing so that one television unit is visible through each of said eye openings, and an optical unit mounted in each of said eye openings whereby peripheral light from said television units enters the eyes of the wearer to create a sensation of peripheral vision of approximately 140 degrees.

2. A stereoscopic television apparatus for individual use comprising an enclosed, hollow casing, one portion of said casing being concave to fit about the face of a wearer, said one portion having two eye openings, means to mount said casing on the head of a wearer with said eye openings in position to be looked through by the wearer, two television units mounted within said casing so that one television unit is visible through each of said eye openings, the mounting for each of said television units being movable, a knob on the exterior of said casing for each of said two television units, means connected between a knob and a television unit so that the position of the television unit may be varied selectively, and an optical unit mounted in each of said eye openings whereby peripheral light from said television units enters the eyes of the wearer to create a sensation of peripheral vision of approximately 140 degrees.

References Cited in the file of this patent

UNITED STATES PATENTS

| | | |
|---|---|---|
| 770,470 | Mills | Sept. 20, 1904 |
| 1,637,092 | Thompson | July 26, 1927 |
| 2,156,911 | Brown | May 2, 1939 |
| 2,388,170 | McCollum | Oct. 30, 1945 |
| 2,484,591 | Rochwite | Oct. 11, 1949 |
| 2,540,144 | Stern | Feb. 6, 1951 |
| 2,667,810 | Jaros | Feb. 2, 1954 |
| 2,810,385 | Reed | Oct. 22, 1957 |